United States Patent Office 2,830,934
Patented Apr. 15, 1958

2,830,934
PROCESS FOR PRODUCTION OF PENICILLIN

Thomas E. Freaney, Terre Haute, Ind., assignor to Commercial Solvents Corporation, Terre Haute, Ind., a corporation of Maryland No Drawing. Application July 21, 1955
Serial No. 523,615

4 Claims. (Cl. 195—36)

My invention relates to the production of pencillin and more particularly it relates to a process whereby carbohydrate is continuously fed to the penicillin fermentation resulting in an increased yield of penicillin in the fermentor.

The most widely used penicillin production process using the organism *Penicillin chrysogenum* employs a nutrient medium containing lactose, corn steep liquor, a phosphate source, a buffer such as calcium carbonate, an anti-foam agent, and a precursor, usually potassium phenyl acetate. Other sugars such as glucose and sucrose have been employed in penicillin fermentations; however, lactose is preferred because it is fermented at a slow rate in comparison to the rapid rates at which glucose and sucrose are fermented and consequently when lactose is employed, the carbohydrate is very slowly utilized and the organism is enabled to produce penicillin over a longer period of time. When glucose and sucrose are employed, the carbohydrate is rapidly used up and when no more is available, the fermentation ceases even though the organism could produce more penicillin if it were permitted to continue to grow in a proper nutrient medium.

Soltero and Johnson have described a process in Applied Microbiology, volume I, page 52, whereby glucose and sucrose, the sugars rapidly consumed in the penicillin fermentation, were continuously fed at a specific rate throughout the fermentation rather than being added to the medium at the beginning of the fermentation in the entire amount. Thus, while the total amount of sugar employed is no more than if all the sugar were added at the beginning of the fermentation, still the amount available to the organism is limited at any particular time during the fermentation and the fast fermenting sugar is thereby employed satisfactorily without the above-indicated difficulty usually encountered, i. e. quick utilization of all of the glucose or sucrose resulting in a shortened fermentation period and a corresponding decrease in penicillin yield. The prior art process involved continuous feeding of glucose or sucrose at a certain constant rate throughout the fermentation or the intermittent feeding of the carbohydrate at predetermined intervals throughout the fermentation. It was found in the prior art process that the optimum rate for continuous feeding of glucose was 0.030 percent per hour, and for sucrose 0.036 percent per hour.

I have now discovered a new process employing the continuous feeding feature whereby I am able to employ the fast-fermenting sugars such as glucose, sucrose, and glucose- and sucrose-containing materials, such as high test molasses, and obtain higher yields of penicillin than can be obtained with the widely employed lactose process or the prior art continuous glucose feeding process described above. My new process is economical, convenient to employ, and results in vastly increased yields of penicillin.

My new process for production of penicillin consists essentially of cultivating a penicillin-producing strain of an organism of the genus Penicillium, such as the organism *Penicillium chrysogenum*, in an aqueous nutrient medium which initially contains no carbohydrate and then continuously feeding carbohydrate throughout the fermentation at a variable rate according to the rate at which the carbohydrate is utilized. The variable rate of carbohydrate feeding can be determined by following the rate of utilization of the slow-fermenting lactose in the above-mentioned widely employed lactose process for production of penicillin. Thus in producing penicillin by the action of *Penicillium chrysogenum* in a nutrient medium initially containing 3.60% lactose, 7.0% corn steep liquor, 0.5% calcium carbonate, 0.4% calcium dihydrogen phosphate (the figures being percent by weight) and 0.25% by volume anti-foam agent, the lactose is utilized as indicated in the following table.

TABLE I

| Age of fermentation in hours | Lactose present in medium, percent |
|---|---|
| 0 | 3.60 |
| 20 | 3.56 |
| 40 | 3.15 |
| 60 | 2.33 |
| 80 | 1.33 |
| 100 | 0.78 |
| 120 | 0.48 |

The above table indicates that lactose is more rapidly utilized between 60 and 80 hours than at any other comparable period throughout the fermentation period.

On the basis of a 1000 gallon fermentor, the amount of lactose present in the medium expressed in pounds at the intervals shown in Table I is as listed in the following table.

TABLE II

| Age of fermentation in hours | Lactose present in medium, pounds |
|---|---|
| 0 | 300 |
| 20 | 296 |
| 40 | 262 |
| 60 | 194 |
| 80 | 110 |
| 100 | 65 |
| 120 | 40 |

According to my new process, I inoculate a nutrient medium initially containing substantially no carbohydrate with a penicillin-producing strain of an organism of the genus Penicillium, such as the organism *Penicillium chrysogenum*, and continuously feed an ordinarily fast-fermenting carbohydrate such as glucose, sucrose, etc. to the fermenting medium throughout the fermentation period at the same variable rate at which the slow-fermenting lactose is utilized when it is initially present in the required amount in the nutrient medium. Based on the lactose utilization rate shown in Tables I and II, the feed rate for continuously feeding an ordinarily fast-fermenting carbohydrate such as glucose, sucrose, etc. to a 1000 gallon fermentation involving *P. chrysogenum* and a nutrient medium initially containing all required nutrients except carbohydrate is calculated to be as shown in Table III. The values are obtained by dividing the difference in the amounts of lactose present at successive determinations by the length of the interval between determinations in hours.

TABLE III

| Fermentation age, hours | Feed rate, lbs./hr./1,000 gallons |
|---|---|
| 0–20 | 0 |
| 20–40 | 1.7 |
| 40–60 | 3.4 |
| 60–80 | 4.2 |
| 80–100 | 2.0 |
| 100–120 | 1.1 |

Since Table II shows that some lactose was utilized during the first 20 hours of the fermentation, I have found it desirable in the above instance to begin feeding glucose to the fermentation a few hours prior to the time the fermentation reaches an age of 20 hours, and I prefer to begin feeding the carbohydrate at the rate of 1.7 pounds per hour after the fermentation is continued for about 18 hours.

It will be obvious to those skilled in the art that the rate of utilization of lactose in the ordinary lactose fermentation is not the same under all conditions since many variables are involved. Thus for fermentations carried out under different conditions by different operators in different fermentors, etc., the lactose utilization rates will also vary and will likely be different from that given above. For example a different aeration mechanism, a different agitation system or agitation at different rates, a different batch of steep water, a different buffer material, a different precursor, a different anti-foam agent, etc. are sufficient to change the lactose utilization rate so that under particular sets of circumstances including conditions of operation, identity of operators, identity of equipment, source and type of constituents in the nutrient medium, etc., the lactose utilization rate should be determined and then all other factors being the same, the fast-fermenting carbohydrate continuously fed at the determined rate.

Obviously, the production of penicillin by organisms of the genus Penicillium using the above-mentioned widely employed lactose fermentation process is quite familiar to those skilled in the art and such persons skilled in the art are able to effect the fermentation at essentially the proper pH, temperature, under essentially the proper conditions of agitation and aeration, etc. and also follow the fermentation so that it can be stopped when the amount of penicillin in the fermentation medium reaches a maximum, generally about 120 hours. Generally, I prefer to carry out the lactose penicillin fermentation with *Penicillium chrysogenum* using agitation and aeration, a temperature of about 24.5–26.5° C., an initial pH of about 5.4 and to continue the fermentation for a period of about 120 hours. My preferred medium contains 3.5% lactose, 7.0% corn steep liquor, 0.5% calcium carbonate, 0.4% potassium dihydrogen phosphate (all by weight) and 0.25% corn oil by volume. The fermentation is conducted under sterile conditions, the medium being sterilized prior to inoculation with the organism all of which is familiar to those skilled in the art.

The following examples are offered to illustrate my invention; however, I do not intend to be limited to the specific proportions, procedures, or materials. Rather I intend to include within the scope of my invention, all equivalents obvious to those skilled in the art.

Example I

A series of runs was carried out wherein a 1500 gallon portion of a nutrient medium containing 7.0% corn steep liquor, 0.5% calcium carbonate, 0.4% potassium dihydrogen phosphate (the percentages being by weight), and 0.25% corn oil by volume was inoculated with the organism *Penicillium chrysogenum*. Following inoculation, glucose was fed to the fermentor continuously at the rate shown in Table III and the fermentation continued for a period of 120 hours. Potassium phenyl acetate precursor was added to the fermentation with the glucose at the following rate.

TABLE IV

| Fermentation age, hours | Feed rate, lbs./hr./1,000 gallons |
|---|---|
| 0–20 | 0 |
| 20–40 | .313 |
| 40–60 | .603 |
| 60–80 | .802 |
| 80–100 | .401 |
| 100–120 | .250 |

The fermentation medium was agitated at the rate of 174 R. P. M. with a six-bladed turbine and aerated at the rate of 100 cubic feet per minute throughout the fermentation which was conducted at a temperature of 24.5° C. for the first 36 hours and at 26.5° C. thereafter. The initial pH of the fermentation medium was about 5.4. The results of the series of runs are shown in the following table.

TABLE V

| Run No. | Penicillin produced, units/Ml. |
|---|---|
| A–367 | 2,580 |
| A–368 | 2,720 |
| A–372 | 2,680 |
| A–374 | 3,000 |
| A–376 | 3,040 |
| A–377 | 2,600 |
| A–378 | 2,930 |
| A–380 | 3,220 |
| A–381 | 2,635 |
| A–382 | 2,806 |
| A–383 | 2,775 |
| Average | 2,817 |

Example II

Two control runs using the standard lactose fermentation process wherein a 1500 gallon portion of nutrient medium containing 3.5% lactose, 7.0% corn steep liquor, 0.5% calcium carbonate, 0.4% potassium dihydrogen phosphate (these percentages being by weight) and 0.25% corn oil by volume was sterilized, inoculated with the organism *Penicillium chrysogenum* and fermented for 120 hours. The temperature during the first 36 hours was maintained at 24.5° C. and from the 36th hour through the end of the fermentation at 26.5° C. Agitation was effected at the rate of 174 R. P. M. with a six-bladed turbine and aeration at the rate of 100 cubic feet per minute with potassium phenyl acetate as a precursor added at the rate of 0.27% each sixth hour throughout the fermentation. The results of the two control runs are shown in the following table.

TABLE VI

| Run No. | Penicillin produced, units/Ml. |
|---|---|
| A–366 | 2,140 |
| A–384 | 2,460 |
| Average | 2,300 |

Example III

Three additional runs for comparative purposes were made wherein the process was exactly according to that shown in Example I except that the glucose was fed at a constant rate throughout the fermentation period. The feed rate in the three runs varied from run to run and the results are shown in the following table. Potassium phenyl acetate as a precursor was added at the rate of .027% each sixth hour in the first two runs and continuously as a mixture with carbohydrate at the rate of 0.720 pound per hour in the third run.

TABLE VII

| Run No. | Feed rate pounds/hr. | Penicillin produced, units/Ml. |
|---|---|---|
| A-357 | 4.8 | 2,140 |
| A-359 | 4.5 | 2,420 |
| A-365 | 3.75 | 2,200 |
| Average | | 2,253 |

*Example IV*

A series of runs was made using the process described in Example I except that raw sucrose was fed to the fermentation at the rate shown in Table III instead of glucose. The results are shown in the following table.

TABLE VIII

| Run No. | Penicillin produced, units/Ml. |
|---|---|
| A-390 | 3,160 |
| A-396 | 3,200 |
| Average | 3,180 |

*Example V*

A series of runs was conducted using the process described in Example I except that high test molasses was fed to the fermentation instead of glucose. The molasses was fed to the fermentation at a rate such that the rate of sucrose addition corresponded to that given in Table III. The results are shown in the following table.

TABLE IX

| Run No. | Penicillin produced, units/Ml. |
|---|---|
| A-392 | 2,800 |
| A-394 | 2,680 |
| A-395 | 2,840 |
| A-400 | 2,820 |
| Average | 2,785 |

*Example VI*

A series of runs was made wherein a 20,000-gallon portion of a nutrient medium containing 7% corn steep liquor, 0.5% calcium carbonate, 0.2% potassium dihydrogen phosphate (these percentages by weight) and 0.25% corn oil by volume was inoculated with the organism *Penicillium chrysogenum* and fermented for 112 hours. Raw sucrose was continuously fed at the following rate which is based on the lactose consumption in the standard lactose fermentation in the identical equipment and under the identical conditions.

TABLE X

| Fermentation age, hours | Feed rate, lbs./hr./1,000 gallons |
|---|---|
| 0-15 | 0 |
| 15-35 | 2.16 |
| 35-55 | 4.48 |
| 55-75 | 3.00 |
| 75-95 | 1.50 |
| 95-112 | 1.30 |

The fermentation was conducted at a temperature of 24.5° C. for the first 36 hours and 26.5° C. thereafter with agitation at the rate of 84 R. P. M. using five 6-bladed turbines drawing 0.7-0.8 H. P. and aeration at the rate of 800 cubic feet per minute under a pressure of 10 pounds per square inch. The precursor, potassium phenyl acetate, was continuously fed to the fermentation in the sucrose solution at the following rate.

TABLE XI

| Fermentation age, hours | Feed rate, lbs./hr./1,000 gallons |
|---|---|
| 0-15 | 0 |
| 15-35 | 0.480 |
| 35-55 | 0.996 |
| 55-75 | 0.666 |
| 75-95 | 0.333 |
| 95-112 | 0.289 |

The results of five runs conducted in the above-described manner are shown in the following table.

TABLE XII

| Run No. | Penicillin produced, units/Ml. |
|---|---|
| XFC-280 | 3,237 |
| XFC-282 | 3,351 |
| XFC-283 | 2,850 |
| XFC-284 | 3,093 |
| XFC-285 | 2,800 |
| Average | 3,066 |

Now having described my invention, what I claim is:

1. A process for the production of penicillin by fermentation of a nutrient medium by the organism *Penicillium chrysogenum*, which comprises inoculating with the organism *Penicillium chrysogenum* a nutrient medium which initially is substantially free from assimilable sugar, during the resulting fermentation continuously feeding to the nutrient medium a sugar, selected from the class consisting of glucose, sucrose and high-test molasses, the sugar being fed continuously but at a rate which varies with the time in such manner that the sugar fed during each time interval is substantially equivalent to that of the lactose consumed during the same time interval in another fermentation by the same organism under the same operating conditions and with a nutrient medium having the same composition except that it initially contains lactose in amount sufficient to supply the entire sugar requirements of the organism during the fermentation, the lactose present initially in the nutrient medium being the sole source of assimilable sugar supplied to the organism during the fermentation.

2. The process of claim 1 wherein the carbohydrate is glucose.

3. The process of claim 1 wherein the carbohydrate is sucrose.

4. The process of claim 1 wherein the carbohydrate material is high test molasses.

References Cited in the file of this patent

UNITED STATES PATENTS

| | | |
|---|---|---|
| 1,867,946 | Brougham | July 19, 1932 |
| 1,891,841 | Sak | Dec. 20, 1932 |
| 2,083,598 | Effront | June 15, 1937 |
| 2,422,777 | Eisenberg et al. | June 24, 1947 |
| 2,578,738 | Pridham | Dec. 18, 1951 |
| 2,609,327 | Kolachov et al. | Sept. 2, 1952 |
| 2,686,754 | Monod | Aug. 17, 1954 |

FOREIGN PATENTS

| | | |
|---|---|---|
| 346,361 | Great Britain | Apr. 7, 1931 |